(12) United States Patent
Homner

(10) Patent No.: US 12,276,301 B2
(45) Date of Patent: Apr. 15, 2025

(54) PUSH/PULL ROD

(71) Applicant: S-Fasteners GmbH, Althengstett (DE)

(72) Inventor: Bernhard Homner, Calw (DE)

(73) Assignee: S-FASTENERS GmbH (DE)

( * ) Notice: Subject to any disclaimer, the term of this patent is extended or adjusted under 35 U.S.C. 154(b) by 324 days.

(21) Appl. No.: 17/795,478

(22) PCT Filed: Jan. 27, 2021

(86) PCT No.: PCT/EP2021/051841
§ 371 (c)(1),
(2) Date: Jul. 26, 2022

(87) PCT Pub. No.: WO2021/151931
PCT Pub. Date: Aug. 5, 2021

(65) Prior Publication Data
US 2023/0049914 A1 Feb. 16, 2023

(30) Foreign Application Priority Data
Jan. 27, 2020 (DE) ............ 20 2020 100 426.3

(51) Int. Cl.
*F16B 7/06* (2006.01)
*F16C 7/06* (2006.01)

(52) U.S. Cl.
CPC . *F16B 7/06* (2013.01); *F16C 7/06* (2013.01)

(58) Field of Classification Search
CPC .................................. F16C 7/06; F16B 7/06
See application file for complete search history.

(56) References Cited

U.S. PATENT DOCUMENTS

| | | | | |
|---|---|---|---|---|
| 2,810,595 A | * | 10/1957 | Purdy | F16B 7/06 403/46 |
| 2,810,596 A | | 10/1957 | Elam | |
| 3,415,324 A | * | 12/1968 | Austin, Jr. | F16C 7/06 416/61 |
| 3,866,650 A | * | 2/1975 | Larkin | F16B 7/182 411/285 |
| 5,129,148 A | * | 7/1992 | Adams | F16C 33/208 29/898.15 |

(Continued)

FOREIGN PATENT DOCUMENTS

DE 10 2011 053 063 B3 2/2013
EP 2320100 B1 9/2012
(Continued)

*Primary Examiner* — Michael P Ferguson
*Assistant Examiner* — Zachary A Hall
(74) *Attorney, Agent, or Firm* — Frijouf, Rust & Pyle, P.A.

(57) ABSTRACT

The invention relates to a push/pull rod (10) comprising at least one first fastening device (12) with a coupling element (12*a*) and a shank (12*b*) which is arranged on it, at least one first connection piece (18), wherein the first fastening device (12) is connected to the first connection piece (18) such that it can be rotated via a threaded arrangement (30) in order to change the length of the push/pull rod (10), a holding device with first and second holding elements interact, and are pressed against one another by means of a spring element (28), wherein the first holding element of the holding device is connected fixedly to the first connection piece (18) for conjoint rotation, and the second holding element is arranged fixedly on the first fastening device (12) for conjoint rotation.

18 Claims, 8 Drawing Sheets

(56) References Cited

U.S. PATENT DOCUMENTS

| | | | | |
|---|---|---|---|---|
| 7,179,011 B1 | * | 2/2007 | Cohen | F16B 7/06 403/315 |
| 7,451,962 B1 | * | 11/2008 | Kennedy | F16G 11/12 254/233 |
| 7,575,403 B2 | * | 8/2009 | Hsieh | F16B 7/06 410/85 |
| 2007/0223994 A1 | * | 9/2007 | Cohen | F16B 39/106 403/376 |
| 2012/0224913 A1 | | 9/2012 | Haller | |

FOREIGN PATENT DOCUMENTS

| | | | | | |
|---|---|---|---|---|---|
| EP | 3115294 | B1 | * | 4/2018 | B64C 13/30 |
| FR | 460408 | A | * | 12/1913 | F16C 7/06 |
| GB | 524717 | A | * | 8/1940 | F16C 7/06 |
| WO | WO 2013/164243 | | | 11/2013 | |

* cited by examiner

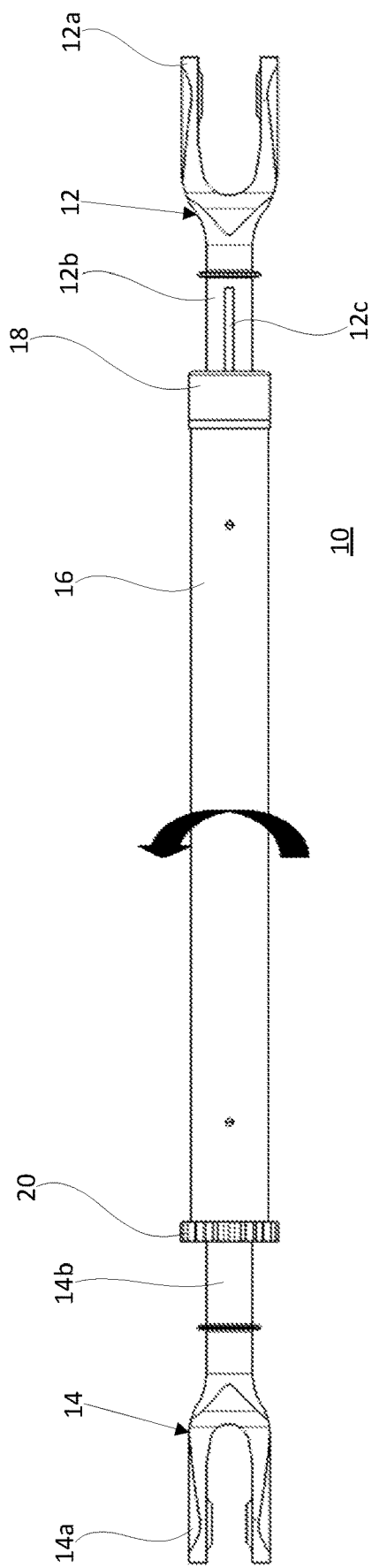
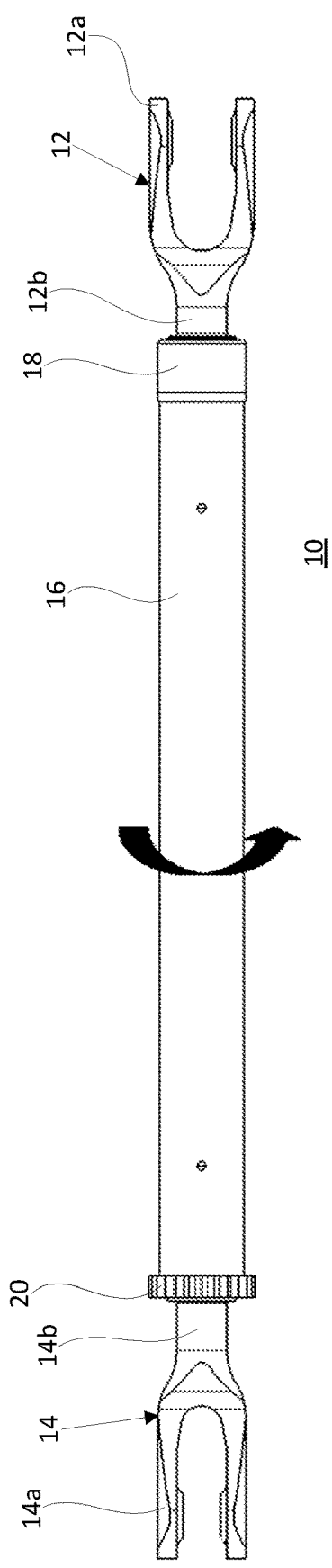
Fig. 1
Fig. 2

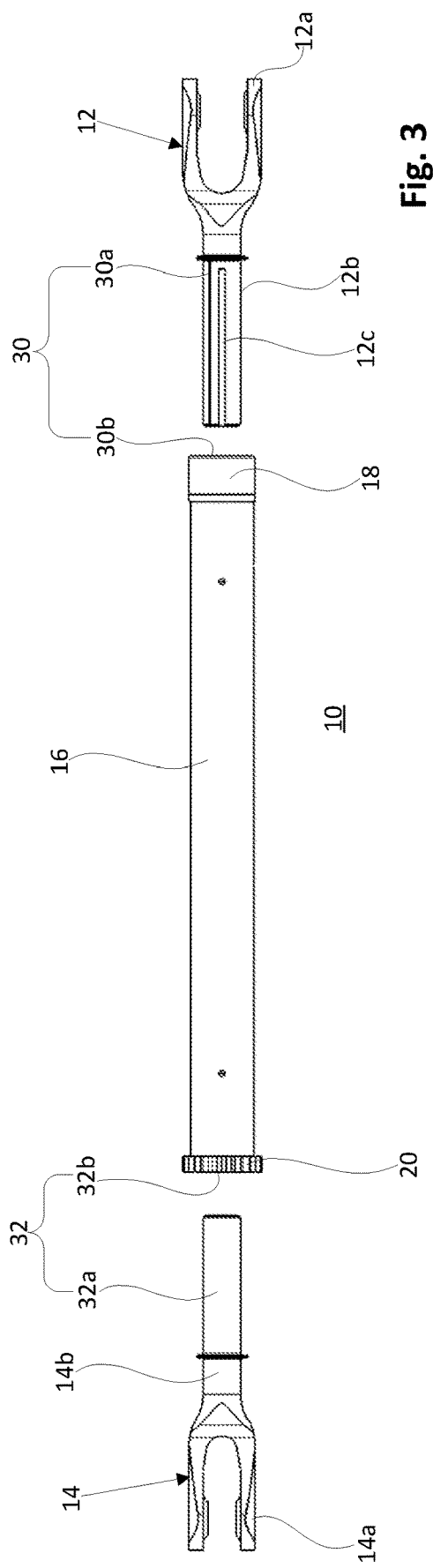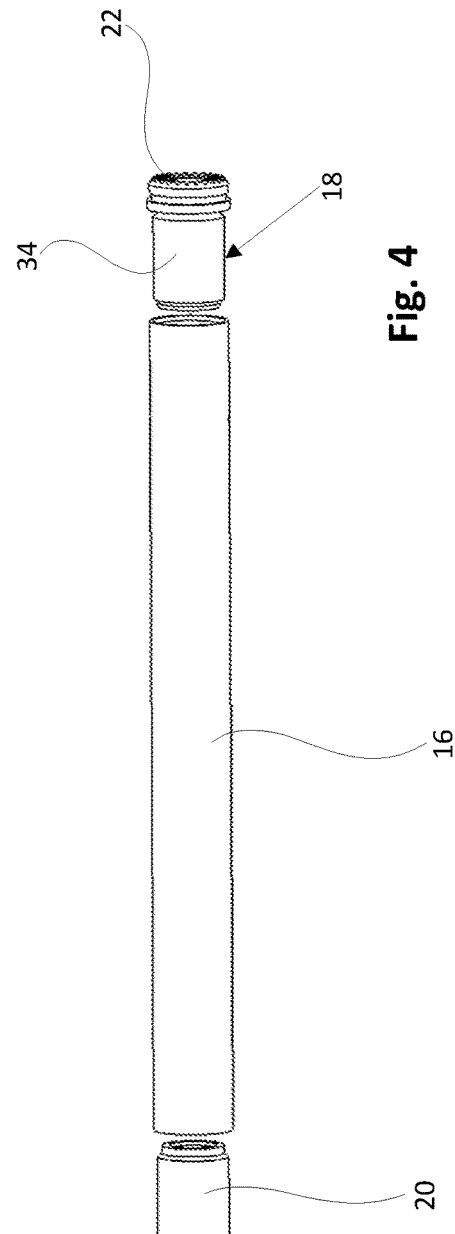

PUSH/PULL ROD

This patent application is the national phase entry of PCT/EP2021/051841, international application filing date Jan. 27, 2021, which claims the benefit and priority of and to German patent application no. 20 2020 100 426.3, filed Jan. 27, 2020.

PCT/EP2021/051841, international application filing date Jan. 27, 2021 and German patent application no. 20 2020 100 426.3, filed Jan. 27, 2020 are incorporated herein by reference hereto in their entireties.

BACKGROUND OF THE INVENTION

The invention relates to a push/pull rod.

Push/pull rods can be used as a suspension device, for example, in particular for suspending structural elements, but also for laterally fastening or supporting the bottom of luggage boxes, cabinet elements or other interior equipment, including those in a vehicle or an aircraft. These push/pull rods have two fastening elements which are connected to one another by a shank with a connection piece, via a threaded arrangement. One of these two fastening elements is connected to the connection piece via a left-hand thread, and the other fastening element is connected to the connection piece via a right-hand thread, thus allowing the total length of the push/pull rod to be varied by rotating the connection piece against the two fastening elements. Such an adjustable configuration of the length of the push/pull rod can be used compensate for different ceiling heights of an aircraft or other vehicles, for example, so as to ensure that luggage boxes or other elements to be suspended will hang aligned in a horizontal plane.

In order to ensure that the selected length of the push/pull rod will not change after adjustment, an anti-rotation lock is provided. For this purpose, the shank of each fastening element interacts with spring-loaded latching elements. The spring force generated by the spring is sufficient to prevent the latching elements from unintentionally rotating in relation to each other, which would cause an undesired change in the length of the push/pull rod.

A push/pull rod of this type is disclosed in EP 2 320 100 B1. This push/pull rod comprises two fastening devices which engage in a connection piece having end faces that are spaced apart from one another in the axial direction and a shank. The two connection pieces are connected to one another. The fastening device is rotatably connected to the connection piece via a threaded arrangement in each case in order to enable a change in length of the push/pull rod. In addition, a latching device with first and second latching elements facing each other in the axial direction and cooperating with each other is provided in a connection piece, which latching elements are pressed against one another by means of a spring element. The first latching element of the latching device is connected to the connection piece for conjoint rotation, and the second latching element is arranged on the fastening device for conjoint rotation. The first end of the spring element is supported on a support shoulder formed on the connection piece and its second end is supported on the second latching element. The latching elements releasably lock the rotational movement of the fastening device relative to the connection piece in a plurality of rotational positions by way of a locking force that is predefined by the spring force.

However, this design has the considerable disadvantage that, depending on the extended position of the fastening device, the spring element will generate a different spring force for the anti-rotation lock of the latching device. When the fastening devices are rotated against each other relative to the associated connection piece via the threaded arrangement, the fastening devices will move away from each other, causing the spring force of the spring element for the anti-rotation lock of the latching device to diminish. When the fastening devices move towards each other, the spring force of the spring element for the anti-rotation lock of the latching device will increase. Moreover, an additional disadvantage of this design is that the latching device with the spring element will come apart during disassembly.

This disadvantage is overcome by the push/pull rod as disclosed in WO 2013/164243 A1. The first connection piece comprises a main body and a sleeve that surrounds the two holding elements and the spring element in some areas. The sleeve is connected to the main body, with the sleeve having an internal diameter that ensures a relative movement of the holding elements with respect to one another and of the spring element. The sleeve is fixed in the axial direction with respect to the main body. The first connection piece holds the holding device with the spring element in the two axial directions. The holding device is configured as a latching device with a first latching element and a second latching element. The second latching element has a plurality of latching lugs which engage in latching grooves of the first latching element. The first latching element likewise has a plurality of latching lugs which engage in latching grooves of the second latching element. When the first fastening device is rotated into or out of the first connection piece, the latching lugs of the latching device will slide against each other against the spring force, with one latching element moving in the axial direction against the spring force. One latching element will move relative to the other latching element until the respective latching lugs engage in adjacent latching grooves. The maximum force required to rotate the first latching element relative to the second latching element is the same for each movement of the one latching lugs over the other latching lugs. In the anti-rotation position, i.e. when the latching lugs engage in the latching grooves, the spring force of the spring element is also always the same, regardless of the travel position of the first fastening device relative to the first connection piece.

The disadvantage here is the complex, costly multi-part design, in which the sleeve can come loose during operation.

SUMMARY OF THE INVENTION

It is therefore the object of the invention to provide an improved design of a push/pull rod which overcomes the above mentioned disadvantages and in which the spring force of the spring element for the anti-rotation lock of the holding device always remains constant, irrespective of the relative position of the fastening device with respect to the associated connection piece.

This object is accomplished by the characterizing features of claim 1 in conjunction with the features of its preamble.

The dependent claims relate to advantageous further developments of the invention.

The invention is based on the realization that by providing latching lugs directly on the spring element, a more direct force transmission and thus adjustability of the spring force can be achieved in a simple manner.

According to the invention, in the second latching element at least one latching lug is fixedly arranged directly on a spring element. This is a simple way of achieving a respective spring force that will remain constant with respect to the first connection piece and can be adjusted more easily.

In addition, this design allows for easy assembly, which reduces costs. Loosening of individual parts is prevented, as are malfunctions.

In one embodiment of the invention, the sleeve is firmly connected to the spring element or to a plurality of spring elements. This simplifies installation.

In particular, the sleeve, the spring element and the latching lugs of the second latching element form a structural unit which is, for example, formed in one piece. This considerably reduces the assembly work.

To make this unit as lightweight as possible and as simple as possible to manufacture, it can be made of plastic.

The spring elements can be designed as spring arms which project inwards from the inner wall of the sleeve and include at least one latching lug. This ensures easy production.

In one embodiment of the invention, a groove is provided in the shank of the first fastening element. The sleeve is provided with at least one projection, which is in particular directed radially inwardly and engages in the groove of the shank. The projection cooperates with the groove and thus serves to secure the sleeve and the second holding element connected to the sleeve against rotation with respect to the shank. The groove can run parallel to the longitudinal axis of the shank and can be at least as long as the maximum stroke that is made possible via the threaded arrangement between the first fastening device and the first connection piece.

In one embodiment of the invention, the sleeve engages around the shank of the first fastening device, with the shank being rotatably mounted in the main body via the threaded arrangement and via the holding device.

Depending on the specific requirements in each case, the main body and the sleeve can be detachably or non-detachably connected to one another.

Particularly where the main body is detachably connected to the sleeve, it proves advantageous for the main body and sleeve to be connected to one another by a snap-fit connection. This ensures easy assembly.

To allow for further structural design possibilities, it is advantageous for the sleeve to be rotatably mounted on the main body.

Preferably, the shank has a groove provided on and around its outer circumference, into which the sleeve engages.

Preferably, a second fastening device with a shank and a second connection piece are provided so as to provide corresponding fastenings on the two sides of the push/pull rod and also to be able to exchange these if necessary.

The two connection pieces can be connected to one another via a connecting rod.

In one embodiment of the invention, the first and second connection pieces are designed differently and only the first connection piece is provided with the holding device.

The first and second connection pieces can be inserted into a connecting rod and can be fixedly connected to it, in particular screwed and/or glued to it.

Additional advantages, features and possible applications of the present invention will be apparent from the description which follows, in which reference is made to the embodiments illustrated in the drawings.

Throughout the description, the claims and the drawings, those terms and associated reference signs are used as are stated in the list of reference signs below.

BRIEF DESCRIPTION OF THE DRAWINGS

In the drawings,

FIG. 1 is a side view of an embodiment of a push/pull rod in its extended state;

FIG. 2 is a side view of the push/pull rod of FIG. 1 in its retracted state;

FIG. 3 is an exploded side view of the push/pull rod of FIG. 1;

FIG. 4 is an exploded side view of a connecting rod with the first and second connection pieces of the push/pull rod of FIG. 1 of a first embodiment of the invention, in which the first connection piece is shown without sleeve, spring element and second latching element;

DESCRIPTION OF THE INVENTION

Figure 5A:
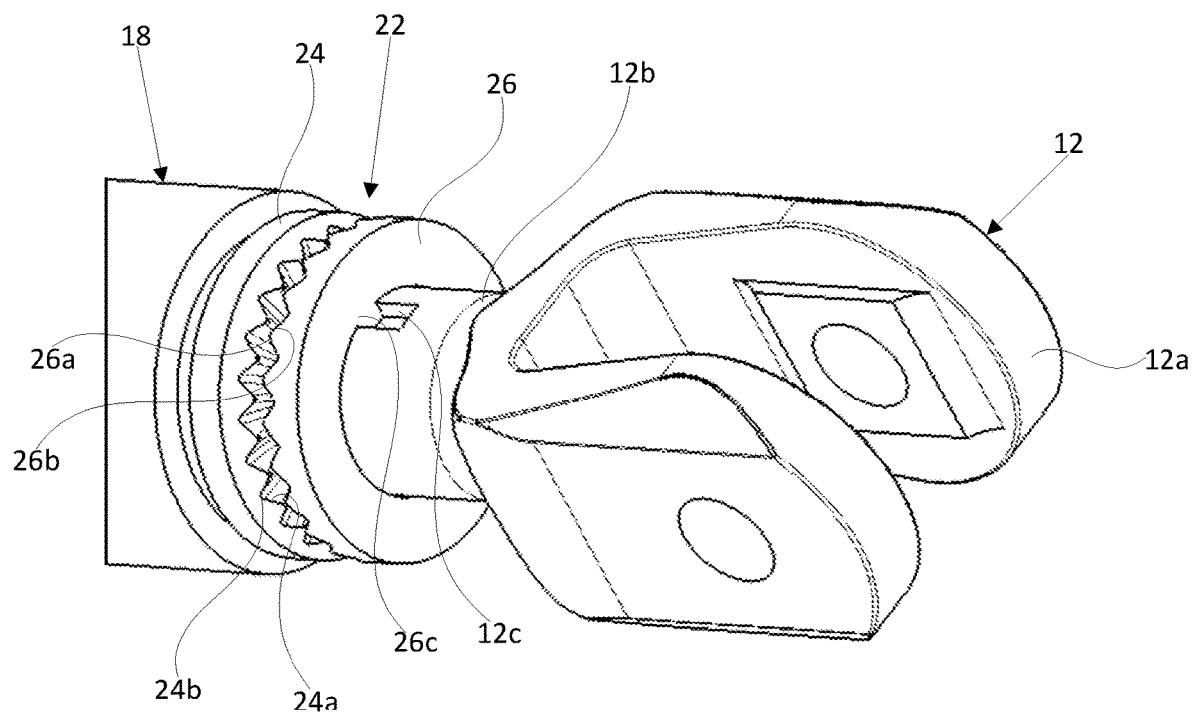
FIG. 5a is a detailed perspective view of a first fastening device of the push/pull rod of FIG. 1 in which the first connection piece has been inserted, with the first and second latching elements still being offset during rotation, which view does not show the sleeve engaging around the latching device nor the spring element.
Figure 5B:
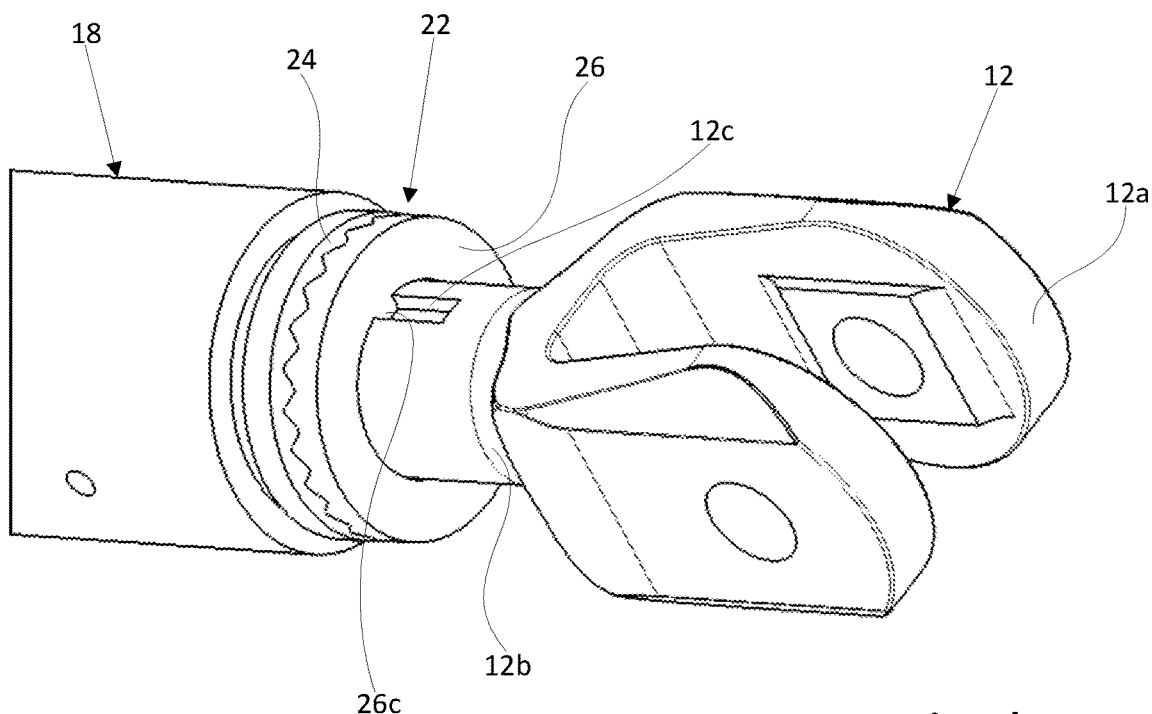
FIG. 5b is a detailed perspective view of the first fastening device of FIG. 5a with the two latching elements meshing.

In the description of the embodiments which follows below, identical reference signs or identical component designations are used to designate identical parts, and the disclosures contained in the entire description can be applied mutatis mutandis to identical parts for which identical reference signs or identical component designations are used. Also, the location information given in the description, such as top, bottom, side, etc., refers to the directly described and depicted drawing figure, and for any change of position, such location information is to be applied mutatis mutandis to the new position.

FIGS. 1 to 7 are views of an embodiment of a push/pull rod 10 which is of a modular design and has a first fastening device 12 at one end thereof and a second fastening device 14 at the second end thereof that is remote in the axial direction, said push/pull rod 10 further comprising a connecting rod 16 arranged between these fastening devices 12, 14 and having a first connection piece 18 on a first side thereof, a second connection piece 20 on a second side thereof, and at least one latching device 22 arranged in the first connection piece 18.

In the embodiment illustrated in FIGS. 1 to 7, the push/pull rod 10 has fastening devices 12 and 14 spaced apart from one another in the axial direction on both sides, with both fastening devices each comprising a coupling element 12a, 14a and a shank 12b, 14b arranged thereon in this case.

The latching device 22 is provided in the first connection piece 18 to prevent relative rotational movement of the first fastening 12 with respect to the first connection piece 18 after adjustment of the overall length of the push/pull rod 10. For this purpose, the latching device 22 has latching elements 24, 26 facing each other as viewed in the axial direction and cooperating with one another, which are pressed together or against one another by means of a spring element 28. Spacer washers or thrust washers can additionally be arranged on either side of the spring element 28 to prevent direct contact between the spring element 28 and the first connection piece 18. Such a thrust washer may be made of a stainless steel material to minimize friction between the spring element 28 and the first connection piece 18.

In addition, a first threaded arrangement 30 is provided between the first fastening device 12, in particular its shank 12b, and the first connection piece 18. Another threaded arrangement 32 is provided between the shank 14b of the second fastening device 14 and the second connection piece 20, see FIG. 3. In order to enable a relative counter-rotational adjustment of the two fastening devices 12 and 14 with respect to the respective associated connection piece 18 or 20, one of the two threaded arrangements, i.e. threaded arrangement 30 of the first connection piece 18 or threaded arrangement 32 of the second connection piece 20, for connection to the associated fastening device 12, 14 is formed as a right-hand thread and the respective other threaded arrangement 30 or 32 is formed as a left-hand thread. When the two fastening devices 12, 14 are in a coupled position relative to components not shown in greater detail here, the fact that the threaded arrangements 30 and 32 are oppositely threaded with respect to one another makes it easy to change the length of the entire push/pull rod 10 by rotating the connecting rod 16, which is firmly connected to the connection pieces 18, 20, relative to the two fastening devices 12, 14.

The threaded arrangements 30 and 32 have an opposing pitch. This thus allows a continuous adjustment of the distance between the ends of the fastening devices 12, 14. Since the fastening devices 12, 14 are coupled to the components to be supported via the respective coupling element 12a, 14a, they are held in a rotationally fixed manner relative to the associated connection piece 12, 14. Turning the connecting rod 16 with respect to the fastening devices 12, 14 results in a certain amount of tensioning between these parts, via the threaded arrangements 30, 32. To facilitate manual initiation of the rotational movement on the connecting rod 16, its surface may be designed to be grippy.

Figure 6:
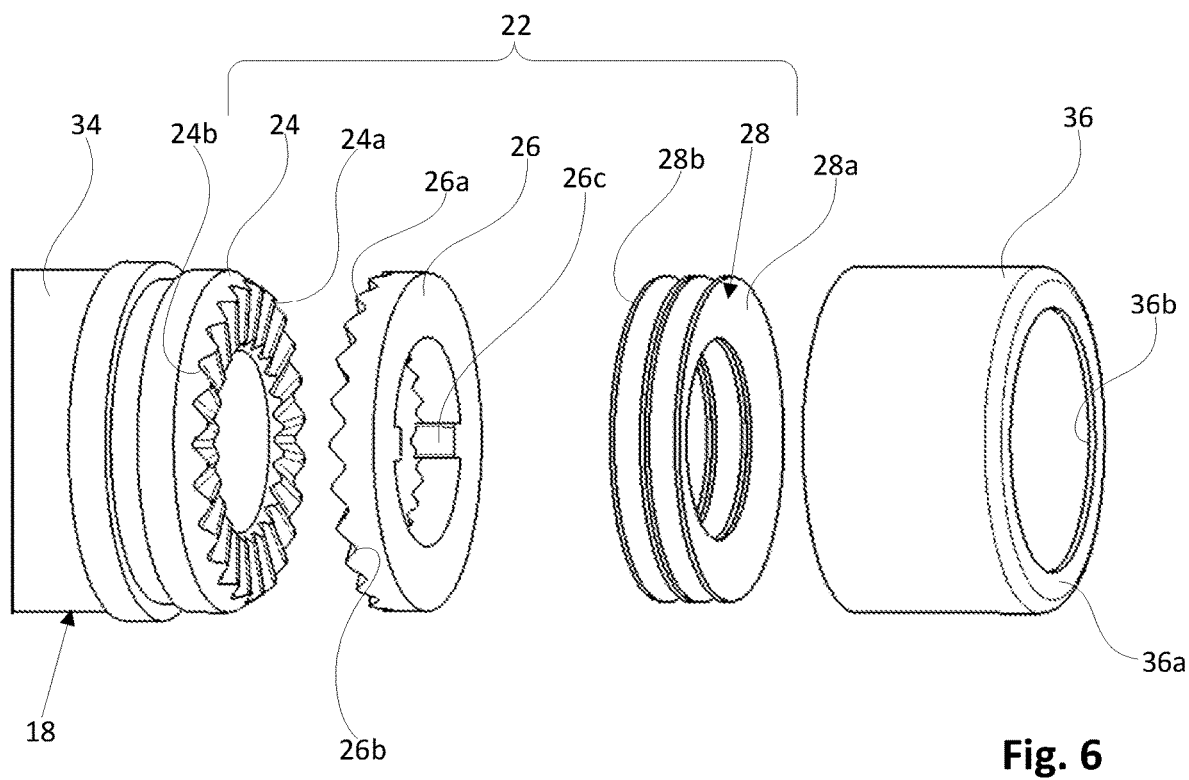
FIG. 6 is a perspective exploded view of the front portion of the first connection piece.
Figure 7:
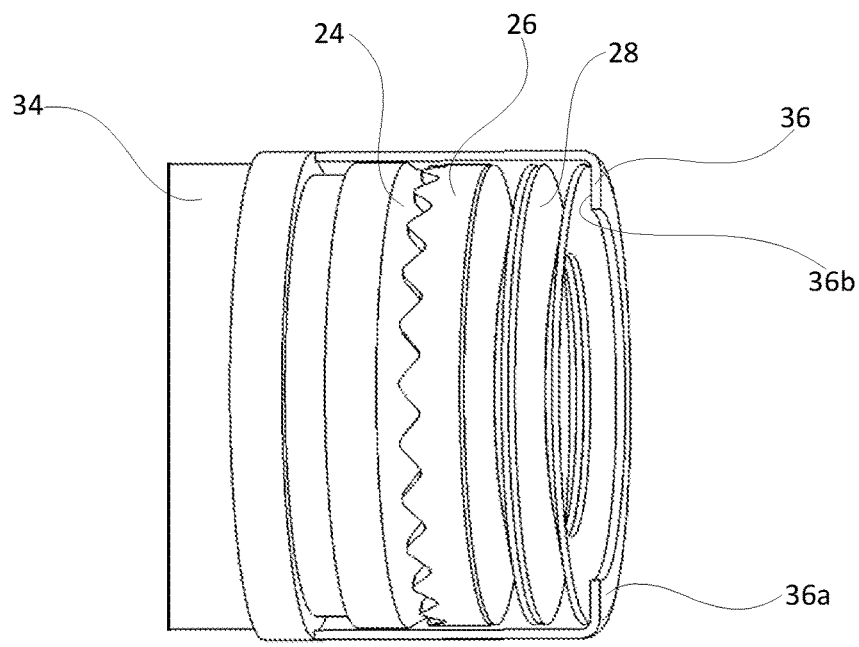
FIG. 7 is a perspective view of the front portion of the first connection piece with the sleeve cut open.

The first latching element 24 of the latching device 22 is securely connected to the first connection piece 18, see FIG. 6. The first connection piece 18, like the second connection piece 20, is inserted into the connecting tube 16 and screwed and/or bonded to it. The first latching element 24, the first connection piece 18, the connecting tube 16, and the second connection piece 20 thus form a structural unit. The second fastening device 14 is screwed into the second connection piece 20 via the second threaded arrangement 32a, 32b.

In this case, the thread 30a of the shank 12b is designed as an external thread and the thread 30b of the first connection piece 18 is designed as an internal thread. The thread 32a of the shank 14b is also formed as an external thread and the thread 32b as an internal thread. One of the two threads, i.e. thread 30b of the first connection piece 18 and the thread 32b of the second connection piece 20, is designed as a right-hand thread for connection to the respective fastening device 12, 14, and the respective other thread 30b, 32b is designed as a left-hand thread.

The second latching element 26 includes a pin-shaped projection 26c that engages into a groove 12c of the first fastening device 12. As a result, the second latching element 26 is connected to the first fastening device 12 for conjoint rotation, as can best be seen from a consolidated view of FIGS. 5a and 5b. Preferably, a plurality of projections 26c and a plurality of respective associated grooves 12c can be provided over the circumference, for better and more stable force transmission.

The first and second latching elements, 24, 26 resp., are in the form of a latching disc. The first latching element 24 has latching lugs 24a and latching grooves 24b, and the second latching element 26 has latching lugs 26a and latching grooves 26b formed in the same manner as those of the first latching element 24. The latching elements 24 and 26 are mounted with their latching lugs 24a, 26a and latching grooves 24b, 26b facing each other. In this case, the latching lugs 24a of the first latching element 24 engage into latching grooves 26b of the second latching element 26, and the latching lugs 26a of the second latching element 26 engage into latching grooves 24b of the first latching element.

The latching elements 24, 26, which are designed as latching discs, each have a central opening which serves to receive the shank 12b of fastening device 12 or the shank 14b of fastening device 14.

The twist angle and the adjustment possibilities between the two latching elements 24, 26 depend on the size of the latter and on the number of latching lugs 24a. 26a and latching grooves 24b. 26b. If latching discs are provided that have a higher number of latching lugs 24a, 26a and latching grooves 24b, 26b, finer latching adjustment can be achieved than is possible with a smaller number of latching lugs 24a, 26a and latching grooves 24b, 26b.

Regardless of this, however, it would still be possible to provide the latching elements 24, 26 with a friction lining or the like, instead of latching grooves, thus allowing an even finer adjustment of the overall length of the push/pull rod 10. This can also be achieved by providing some kind of microstructure on the two surfaces of the latching elements 24, 26 that face one another.

The first connection piece 18 includes a main body 34 and a sleeve 36. The sleeve 36 engages around the outside of the latching elements 24, 26 and has its end facing the main body 34 firmly connected to the main body 34 on the end side facing the main body 34. On the side of the sleeve 36 that is remote from the main body 34, the sleeve 36 has an inwardly directed circumferential flange 36a which forms a support shoulder 36b for the spring element 28 on the inside, see FIG. 7.

The spring element 28 of the latching device 22 is supported via its first end 28a on the support shoulder 36b provided on the sleeve 36 of the first connection piece 18, and via its second end 28b on the second latching element 26. The spring element 28, the sleeve 36, the first and second latching elements 24, 26 are all arranged around the shank 12b of the first fastening device 12, which shank is screwed into the first connection piece 18. The first latching element 24 in turn, being firmly connected to the main body 34, is supported on the main body 34 of the first connection piece 18. Due to the spring element 28 being supported on the support shoulder 36b, and the thus resulting spring force on the latching elements 24, 26 and on the main body 34 and the sleeve 36 and thus on the first connection piece 18, radial anti-rotation lock is effected, via the latching latching lugs 24a and latching grooves 24b, of the external thread 30a on the shank 12b and of the internal thread 30b in the first connection piece 18. The sleeve 36 is spaced laterally from the latching elements 24, 26 and the spring element 28 so that it is free to move relative to the first connection piece 18 and in the axial direction against the spring force of the spring element 28 when the first fastening device 12 is rotated. Since the main body 34 on the one side and the sleeve 36 connected to the main body 34 on the other side hold the latching device 22 with the spring element 28 in the axial direction, the holding force acting on the latching device 22 will always be the same, regardless of the extended position of the first fastening device 12 relative to the first connection piece 18.

The latching elements 24, 26, which are designed as latching discs, are each independently arranged for conjoint rotation on different components of the push/pull rod 10 and are additionally braced against each other by the spring element 28. The second latching element 26 is slightly adjustable in the axial direction against the spring force of the spring element 28, whereby the second latching element 26 can perform a rotational movement of the first fastening device 12 relative to the first connection piece 18 when a torque is applied relative to the first latching element 24, and can releasably lock the first fastening device 12 in a plurality of rotational positions with a predefined locking force. In this case, the locking force corresponds to the spring force of the spring element 28, as the latching lugs 24a, 26a slide against each other, thereby axially displacing the second latching element 26 until the latching lugs 24a, 26a engage into the adjacent latching groove 24b, 26b. This is repeated as long as an appropriate torque is applied between the connecting rod 16 and the first fastening element 12, i.e. until the desired final adjustment of the push/pull rod 10 has been reached. As the first fastening device 12 rotates, it rotates into or out of the first connection piece 18, depending on the direction of rotation, via the threaded assembly 30. Accordingly, the second fastening device 14 also rotates into or out of the second connection piece 20, via the threaded arrangement 32.

In this process, the pin-shaped projection 26c of the second latching element 26 accordingly moves along in the groove 12c of the first fastening element 12. The groove 12c is designed to be as long as the maximum stroke of the first fastening element 12 relative to the first connection piece 18.

FIGS. 8 to 13 are views of an embodiment of the push/pull rod 10 according to the invention, and the same reference signs or component designations are again used to designate identical parts as in the preceding FIGS. 1 to 7. To avoid unnecessary repetition, reference is made to the detailed description provided above with reference to FIGS. 1 to 7.

Figure 8:
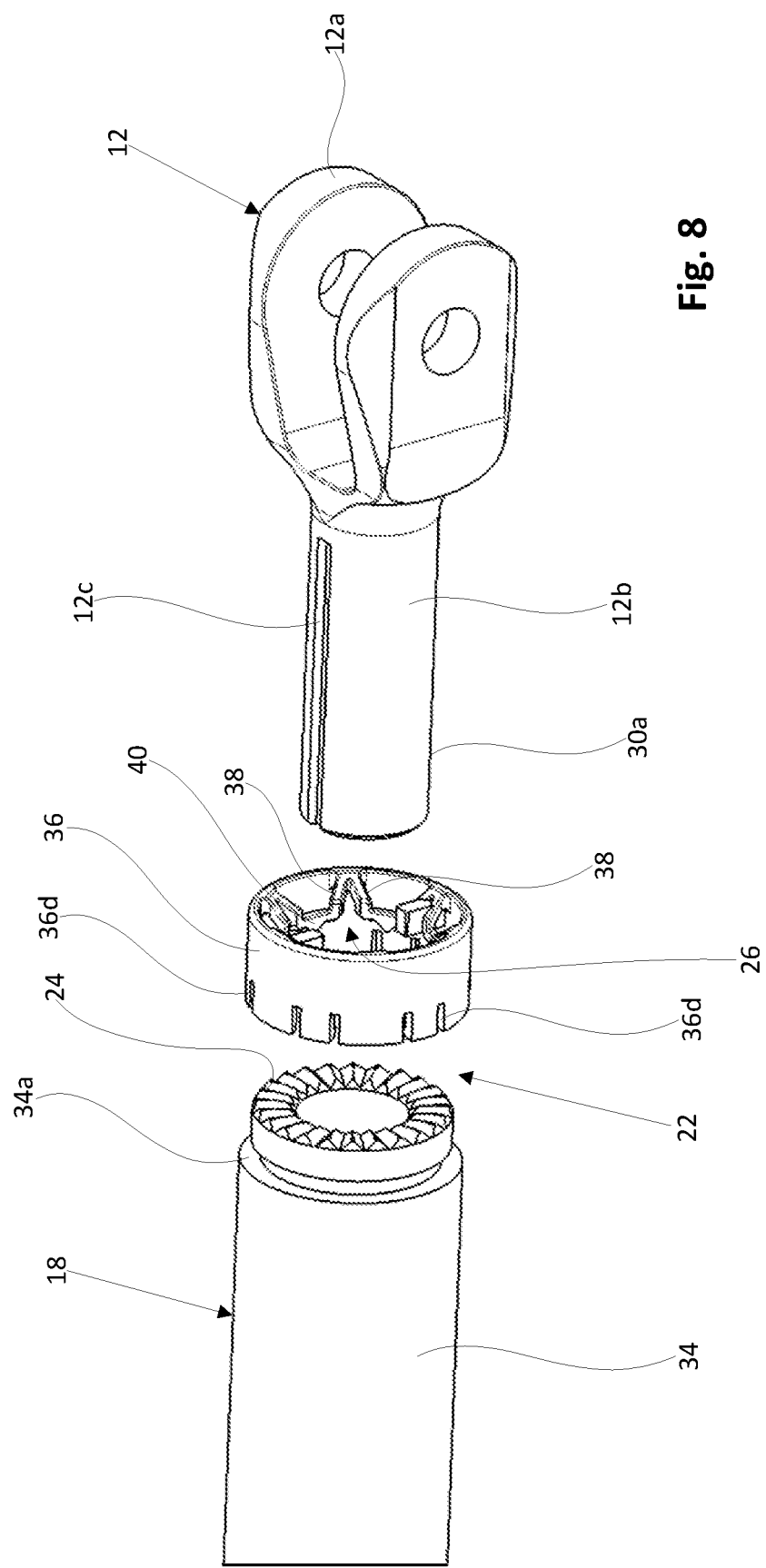
FIG. 8 is a perspective exploded view of the front portion of a first connection piece and a first fastening device of one embodiment of the invention.
Figure 9:
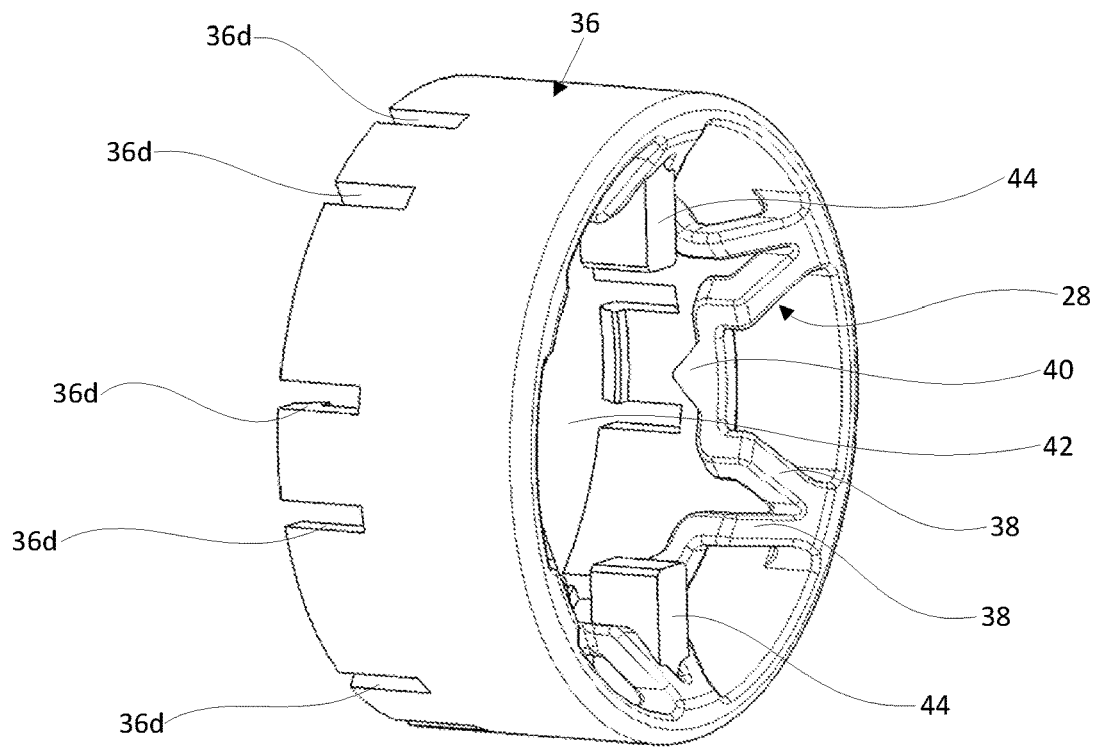
FIG. 9 is a perspective view of the sleeve of the connection piece of FIG. 8.
Figure 10:
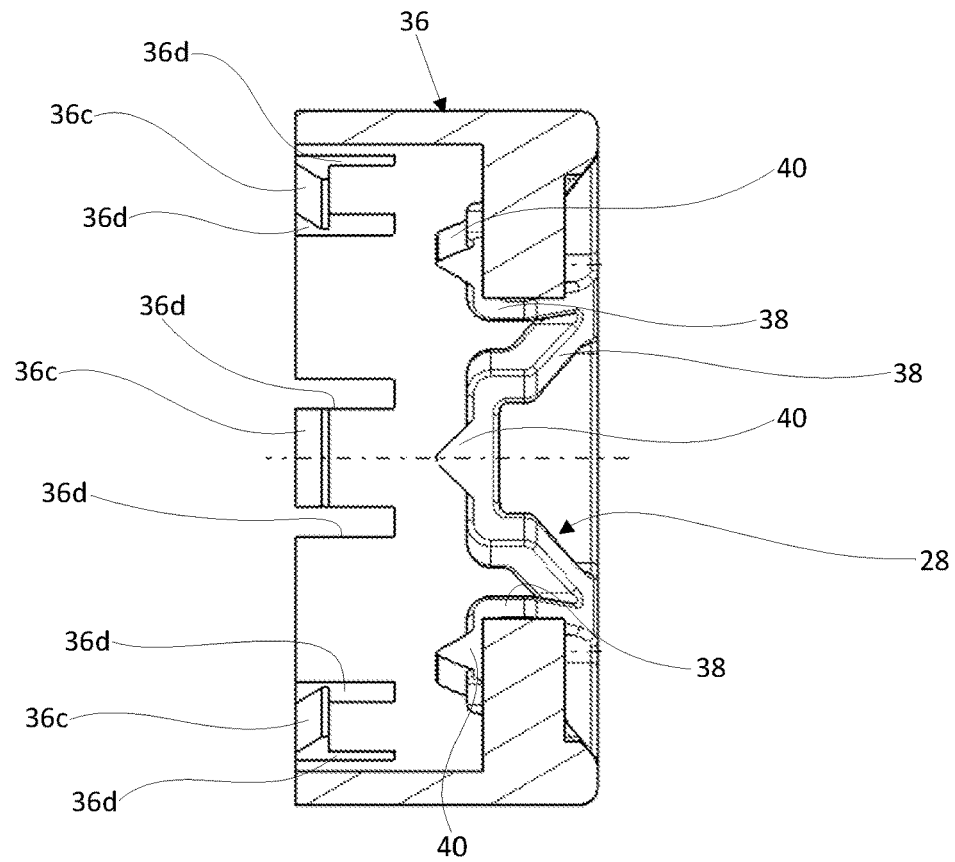
FIG. 10 is a cross-sectional view of the sleeve of FIG. 9.
Figure 11:
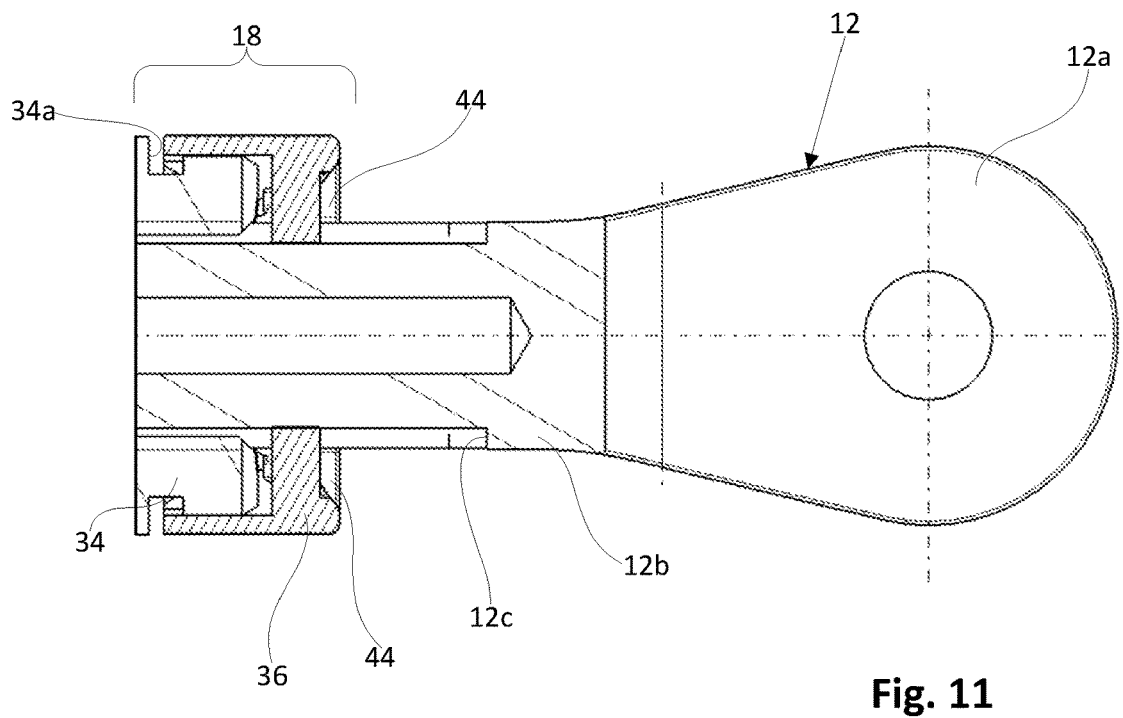
FIG. 11 is a sectional view of the front portion of the first connection piece with the fastening device in the assembled state of FIG. 8.
Figure 12:
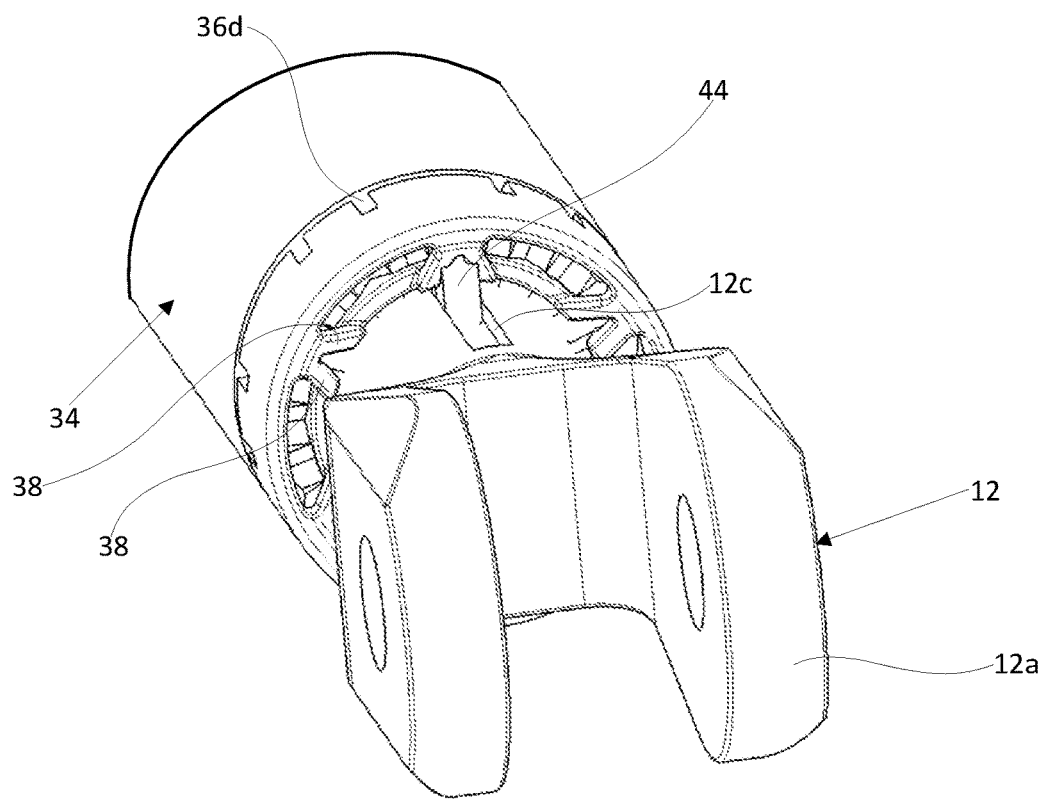
FIG. 12 is a perspective view, taken at an angle from the front, of the fastening device with the connection piece of FIG. 11.
Figure 13:
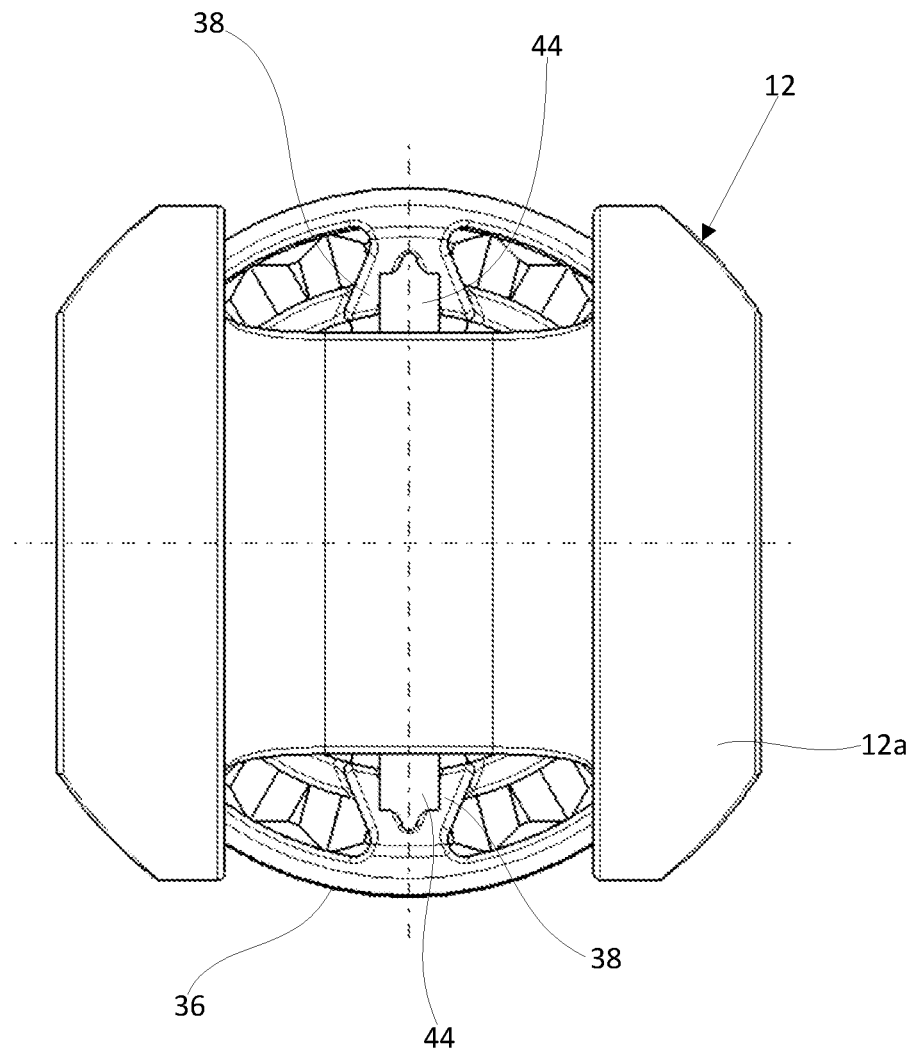
FIG. 13 is a front view of FIG. 12.

The main body 34 of the first connection piece 18 is provided with a groove 34a adjacent to the first latching element 24, see FIG. 8 and FIG. 11. At its end facing the main body 34, the sleeve 36 is provided with inwardly directed pins 36c, and with slots 36d that are arranged on both sides adjacent to the pins 36c. The sleeve 36 is pushed over the latching element 24 via the pins 36c until the pins 36c snap into the groove 34a of the main body 34. As a result, the sleeve 36 is fixed in the axial direction, but is rotatably mounted relative to the main body 34.

The design of the first fastening device 12 is unchanged as compared to that of the first embodiment.

The sleeve 36 is provided with a single or a plurality of spring arm(s) 38, which is/are provided on the inside in the area of the end of the sleeve 36 facing away from the main body 34 and are directed inwards. Each spring arm 38 has a latching lug 40 provided thereon. The spring arms 38 with the latching lugs 40 are arranged in a circle and form a through opening 42 for the shank 12b of the first fastening device 12.

In addition, two projections 44 are provided between two adjacently disposed spring arms 38, with the two projections 44 being offset by 180° from each other. Accordingly, the grooves 12c in the shank 12b are also offset by 180° from each other. The projections 44, the spring arms 38 and the latching lugs 40 are preferably integrally formed from the same plastic material and form a structural unit. This unit can be manufactured in a simple way by plastic injection molding.

In both embodiments, the connection pieces 18 and 20 are firmly connected to the connecting rod 16, preferably screwed and/or glued to it. The connection piece 18 includes the latching device 22. The connection piece 20 does not have such a holding device. In this respect, the connection pieces 18 and 20 can have different designs.

LIST OF REFERENCE SIGNS 10 push/pull rod
12 first fastening device
12a coupling element
12b shank
12c groove
14 second fastening device
14a coupling element
14b shank
16 connecting rod
18 first connection piece
20 second connection piece
22 latching device
24 first latching element
24a latching lugs
24b latching grooves
26 second latching element
26a latching lugs
26b latching grooves
26c pin-shaped projection
28 spring element
28a first end of spring element 28
28b second end of spring element 28
30 threaded arrangement
30a threaded arrangement-part of shank 12b
30b threaded arrangement-part of the first connection piece 18
32 threaded arrangement
32a threaded arrangement—part of shank 14b
32b threaded arrangement—part of second connection piece 20
34 main body of first connection piece 18
34a groove
36 sleeve of first connection place 18
36a flange of sleeve 36
36b support shoulder of sleeve 36
36c pin of sleeve 36
36d slot of sleeve 36
38 spring arm
40 latching lug
42 through hole
44 projection

The invention claimed is:

1. Push/pull rod (10), comprising:
at least one first fastening device (12) with a coupling element (12a) and a shank (12b) which is arranged on it, at least one first connection piece (18), wherein the first fastening device (12) is connected to the first connection piece (18) such that it can be rotated via a threaded arrangement (30) in order to change the length of the push/pull rod (10), a holding device with first and second holding elements which, as viewed in the axial direction, in each case face one another, interact and are pressed against one another by means of a spring element (28), wherein the first holding element of the holding device is connected fixedly to the first connection piece (18) for conjoint rotation, and the second holding element is arranged fixedly on the first fastening device (12) for conjoint rotation, wherein the spring element (28) is active between a region on the first connection piece (18) and a region on the second holding element, and the holding elements in the process releasably lock the rotational movement of the first fastening device (12) relative to the first connection piece (18) in a plurality of rotational positions by way of a predefined locking force, wherein the first connection piece (18) comprises a main body (34) and a sleeve (36) which reaches at least in regions around the two holding elements and the spring element (28), to which the sleeve (36) and the main body (34) are connected, wherein the sleeve (36) has an internal diameter which ensures a relative movement of the holding elements with respect to one another and of the spring element (28), wherein the sleeve (36) is fixed at least in the axial direction with respect to the main body (34), and wherein the first connection piece (18) holds the holding device with the spring element (28) in the two axial directions, the holding device is configured as a latching device (22) with a first latching element (24) and a second latching element (26), wherein the second latching element (26) has a plurality of latching lugs (26a) which engage into latching grooves (24b) of the first latching element (24), and the first latching element (24) likewise has a plurality of latching lugs (24a) which engage into latching grooves (26b) of the second latching element (26), characterized in that, in the case of the second latching element (26), at least one latching lug (40) is arranged fixedly on and integrally formed with a spring element (28);

the spring element (28) has a central opening which serves to receive the shank (12b) of fastening device (12);

a radial anti-rotation lock is effected by the spring element (28) applying a spring force on the first latching element (24) and the second latching element (26); and the second latching element (26) is adjustable in the axial direction against the spring force of the spring element (28), whereby the second latching element (26) can perform a rotational movement of the first fastening device (12) relative to the first connection piece (18) when a torque is applied relative to the first latching element (24), and can releasably lock the first fastening device (12) in a plurality of rotational positions and is repeated as long as an appropriate torque is applied between the connecting rod (16) and the first fastening element (12) until the desired final adjustment of the push/pull rod (10) has been reached.

2. Push/pull rod according to claim 1, characterized in that the sleeve (36) is fixedly connected to the spring element (28) or to a plurality of spring elements.

3. Push/pull rod according to claim 1, characterized in that the sleeve (36), the spring element (28) and the latching lugs (40) of the second latching element (26) form a structural unit which is formed in one piece.

4. Push/pull rod according to claim 1, characterized in that a structural unit is made of plastic.

5. Push/pull rod according to claim 1, characterized in that the spring elements (28) are formed as spring arms (38) which project inwardly from the inner wall of the sleeve (36) and have at least one latching lug (40) formed on them.

6. Push/pull rod according to claim 1, characterized in that the shank (12b) of the first fastening element has a groove (12c), the sleeve (36) has at least one projection, which is directed radially inwardly, which projection engages into the groove (12c) of the shank (12b) and, in cooperation with the groove (12c), serves as an anti-rotation lock of the sleeve (36) and of a second fastening element connected to the sleeve (36) with respect to the shank (12b).

7. Push/pull rod according to claim 6, characterized in that the groove (12c) is parallel to the longitudinal axis of the shank (12b) and is formed to be at least as long as the maximum stroke enabled between the first fastening device (12) and the first connection piece (18) by way of the threaded arrangement (30).

8. Push/pull rod according to claim 1, characterized in that the sleeve (36) engages around the shank (12b) of the first fastening device (12), wherein the shank is fixed in the main body (34) so as to be rotatable therein via the threaded arrangement (30) and via the holding device.

9. Push/pull rod according to claim 1, characterized in that the main body (34) and the sleeve (36) are detachably or non-detachably connected to one another.

10. Push/pull rod according to claim 1, characterized in that the main body (34) and the sleeve (36) are connected to one another via a snap-fit connection.

11. Push/pull rod according to claim 1, characterized in that the sleeve (36) is rotatably mounted on the main body (34).

12. Push/pull rod according to claim 11, characterized in that the first connection piece has a groove (12c) on its outer circumference, into which the sleeve (36) engages in regions.

13. Push/pull rod according to claim 1, characterized in that a second fastening device (14) with a shank (14b) and a second connection piece (20) are provided.

14. Push/pull rod according to claim 13, characterized in that the two connection pieces (18, 20) are firmly connected to one another via a connecting rod (16).

15. Push/pull rod according to claim 13, characterized in that the first and second connection pieces (18, 20) are formed differently and that only the first connection piece (18) is provided with the holding device.

16. Push/pull rod according to claim 1, characterized in that first and second connection pieces (18, 20) are inserted directly, into a connecting rod (16) and are firmly connected to it screwed and/or glued to it.

17. Push/pull rod (10), comprising:
at least one first fastening device (12) with a coupling element (12a) and a shank (12b) which is arranged on it, at least one first connection piece (18), wherein the first fastening device (12) is connected to the first connection piece (18) such that it can be rotated via a threaded arrangement (30) in order to change the length of the push/pull rod (10), a holding device with first and second holding elements which, as viewed in the axial direction, in each case face one another, interact and are pressed against one another by means of a spring element (28), wherein the first holding element of the holding device is connected fixedly to the first connection piece (18) for conjoint rotation, and the second holding element is arranged fixedly on the first fastening device (12) for conjoint rotation, wherein the spring element (28) is active between a region on the first connection piece (18) and a region on the second holding element, and the holding elements in the process releasably lock the rotational movement of the first fastening device (12) relative to the first connection piece (18) in a plurality of rotational positions by way of a predefined locking force, wherein the first connection piece (18) comprises a main body (34) and a sleeve (36) which reaches at least in regions around the two holding elements and the spring element (28), to which the sleeve (36) and the main body (34) are connected, wherein the sleeve (36) has an internal diameter which ensures a relative movement of the holding elements with respect to one another and of the spring element (28), wherein the sleeve (36) is fixed at least in the axial direction with respect to the main body (34), and wherein the first connection piece (18) holds the holding device with the spring element (28) in the two axial directions, the holding device is configured as a latching device (22) with a first latching element (24) and a second latching element (26), wherein the second latching element (26) has a plurality of latching lugs (26*a*) which engage into latching grooves (24*b*) of the first latching element (24), and the first latching element (24) likewise has a plurality of latching lugs (24*a*) which engage into latching grooves (26*b*) of the second latching element (26), characterized in that, in the case of the second latching element (26), at least one latching lug (40) is arranged fixedly on and integrally formed with a spring element (28);

the spring element (28) has a central opening which serves to receive the shank (12*b*) of fastening device (12);

the first latching element (24) and the second latching element (26) are in the form of a latching disc each having a central opening which serves to receive the shank (12*b*) of fastening device (12) or the shank (14*b*) of fastening device (14);

a radial anti-rotation lock is effected by the spring element (28) applying a spring force on the first latching element (24) and the second latching element (28); and the second latching element (26) is adjustable in the axial direction against the spring force of the spring element (28), whereby the second latching element (26) can perform a rotational movement of the first fastening device (12) relative to the first connection piece (18) when a torque is applied relative to the first latching element (24), and can releasably lock the first fastening device (12) in a plurality of rotational positions and is repeated as long as an appropriate torque is applied between the connecting rod (16) and the first fastening element (12) until the desired final adjustment of the push/pull rod (10) has been reached.

18. Push/pull rod (10), comprising:

at least one first fastening device (12) with a coupling element (12*a*) and a shank (12*b*) which is arranged on it, at least one first connection piece (18), wherein the first fastening device (12) is connected to the first connection piece (18) such that it can be rotated via a threaded arrangement (30) in order to change the length of the push/pull rod (10), a holding device with first and second holding elements which, as viewed in the axial direction, in each case face one another, interact and are pressed against one another by means of a spring element (28), wherein the first holding element of the holding device is connected fixedly to the first connection piece (18) for conjoint rotation, and the second holding element is arranged fixedly on the first fastening device (12) for conjoint rotation, wherein the spring element (28) is active between a region on the first connection piece (18) and a region on the second holding element, and the holding elements in the process releasably lock the rotational movement of the first fastening device (12) relative to the first connection piece (18) in a plurality of rotational positions by way of a predefined locking force, wherein the first connection piece (18) comprises a main body (34) and a sleeve (36) which reaches at least in regions around the two holding elements and the spring element (28), to which the sleeve (36) and the main body (34) are connected, wherein the sleeve (36) has an internal diameter which ensures a relative movement of the holding elements with respect to one another and of the spring element (28), wherein the sleeve (36) is fixed at least in the axial direction with respect to the main body (34), and wherein the first connection piece (18) holds the holding device with the spring element (28) in the two axial directions, the holding device is configured as a latching device (22) with a first latching element (24) and a second latching element (26), wherein the second latching element (26) has a plurality of latching lugs (26*a*) which engage into latching grooves (24*b*) of the first latching element (24), and the first latching element (24) likewise has a plurality of latching lugs (24*a*) which engage into latching grooves (26*b*) of the second latching element (26), characterized in that, in the case of the second latching element (26), at least one latching lug (40) is arranged fixedly on and integrally formed with a spring element (28);

the first latching element (24) and the second latching element (26) are in the form of a latching disc each having a central opening which serves to receive the shank (12*b*) of fastening device (12) or the shank (14*b*) of fastening device (14);

a radial anti-rotation lock is effected by the spring element (28) applying a spring force on the first latching element (24) and the second latching element (28);

the second latching element (26) is adjustable in the axial direction against the spring force of the spring element (28), whereby the second latching element (26) can perform a rotational movement of the first fastening device (12) relative to the first connection piece (18) when a torque is applied relative to the first latching element (24), and can releasably lock the first fastening device (12) in a plurality of rotational positions and is repeated as long as an appropriate torque is applied between the connecting rod (16) and the first fastening element (12) until the desired final adjustment of the push/pull rod (10) has been reached;

the second latching element (26) includes a pin-shaped projection [26*c*] (44) that engages into a groove (12*c*) of the first fastening device (12) resulting in the second latching element (26) connected to the first fastening device (12) for conjoint rotation; and the pin-shaped projection (44) of the second latching element (26) accordingly moves along in the groove (12*c*) of the first fastening element (12) during rotational movement of the first fastening device (12) relative to the first connection piece (18).

\* \* \* \* \*